United States Patent [19]

Miki et al.

[11] 4,449,807
[45] May 22, 1984

[54] AUTOMATIC SYSTEM AND INTERCHANGEABLE OPTICAL INSTRUMENT THEREFOR

[75] Inventors: Yukio Miki; Takeshi Egawa, both of Osaka, Japan

[73] Assignee: Minolta Camera Kabushiki Kaisha, Osaka, Japan

[21] Appl. No.: 366,323

[22] Filed: Apr. 7, 1982

[30] Foreign Application Priority Data

Apr. 18, 1981 [JP] Japan .................................. 56-58976
Apr. 23, 1981 [JP] Japan .................................. 56-61938
Apr. 24, 1981 [JP] Japan .................................. 56-63103

[51] Int. Cl.$^3$ .............................................. G03B 3/00
[52] U.S. Cl. ............................... 354/195.1; 354/286; 350/255; 350/257
[58] Field of Search .................... 354/25 R, 25 N, 195, 354/286; 350/255, 257

[56] References Cited

U.S. PATENT DOCUMENTS 4,130,358 12/1978 Lang et al. ........................... 354/286
4,272,174 6/1981 Teramoto et al. ................... 354/195
4,298,266 11/1981 Ludwig .............................. 354/286

FOREIGN PATENT DOCUMENTS

2951433 7/1980 Fed. Rep. of Germany .
55-95933 7/1980 Japan .
56-3684 1/1981 Japan .

Primary Examiner—A. A. Mathews
Attorney, Agent, or Firm—Watson, Cole, Grindle & Watson

[57] ABSTRACT

A driving force transmitting arrangement in an interchangeable optical type optical unit in an optical system including a driving shaft and a driven shaft respectively provided in one part and the other part of the optical instrument which are engageable with or disengageable from each other so that the driving shaft and the driven shaft are connected with or disconnected from each other following the engagement or disengagement between the one part and the other part of the optical instrument. The driving force transmitting arrangement includes a motor for rotating the driving shaft for focusing of the optical system interchangeable optical instrument, and a circuit having a controller of the motor, and a switch to be closed according to connection between the driving shaft and driven shaft. The one part of the optical instrument may be a photographic camera, while its other part may be an interchangeable lens barrel for the camera, and the interchangeable lens barrel is provided with a focusing operation mechanism for the optical system.

22 Claims, 13 Drawing Figures

37 (FOCUS DETECTING CIRCUIT)
22 (MOTOR)  32 (DRIVE CIRCUIT)

FIG. 10

41 (OSCILLATOR)

AUTOMATIC SYSTEM AND INTERCHANGEABLE OPTICAL INSTRUMENT THEREFOR

BACKGROUND OF THE INVENTION
TECHNICAL FIELD

The present invention generally relates to a coupling system or mechanism for an optical apparatus including a main body and an optical assembly detachably attachable to or mountable on the main body such that a driven member in the optical assembly is connected with a driving member in the main body. The optical assembly may be, for example, a photographic camera, a motion picture camera, a TV camera, a still or motion picture projector, a photographic printer or enlarger, or the like, wherein an interchangeable lens assembly is detachably attached to or mounted on a main body and a driving mechanism in the main body is connected with a driven member in the lens assembly for the driving of one or more optical elements therein, i.e., for focusing, zooming or the like.

DESCRIPTION OF THE PRIOR ART

In a conventional single lens reflex camera provided with an interchangeable lens and capable of effecting automatic focusing in accordance with a TTL (Through The Lens) focus detection, a camera body includes a driving member for automatic focusing and a control system therefor for common use with a plurality of interchangeable lenses. At the same time, a driven or follower member is provided in each interchangeable lens, and the driving member and driven member are arranged to be disconnected from or connected with each other as the interchangeable lens barrel is detached from or attached to the camera body. Conventionally, there have been known various systems for the driving force transmission as referred to above.

By way of example, Japanese Laid Open Patent Application No. 55-95933 discloses an arrangement in which a driving shaft, and a driven shaft each having a rotary axis extending in a direction perpendicular to an optical axis, are disposed in a parallel relation to each other for transmission of the driving force therebetween. However, this known arrangement has the disadvantage that a large mechanical friction is produced on the gears and bearings employed therefor due to side pressures exerted on both of the shafts during transmission of the driving force, resulting in seizure when the friction is excessively large. Thus, this arrangement is not preferable from the viewpoint of durability. In addition, this arrangement can be very noisy in some cases. Moreover, this arrangement is disadvantageous in that, since the driving force transmitting mechanism tends to be bulky, large spaces are undesirably occupied in the camera body and interchangeable lens.

Meanwhile, in the arrangement disclosed in Japanese Laid Open Patent Application No. 55-144214, it is so arranged that the driving force is transmitted through employment of a large diameter ring to be rotated about the optical axis. However, this prior art arrangement also has drawbacks in that, since the operating member employed is large, with a consequent large moment of inertia thereof, the speed for reaching the starting and stopping for the driving is undesirably reduced and entails a large energy consumption and a low transmission efficiency. This arrangement is also unsuitable for an optical system in which the lens is adapted to retract into an inner side of a mount portion, for example, as in dual-component zoom lenses or vari-focal lenses, etc.

Furthermore, since the arrangement disclosed in Japanese Utility Model Publication No. 56-3684 is of a system in which the driving force is transmitted between a driving shaft and a driven shaft disposed in a parallel relation to each other, both of these shafts are arranged in parallel with the optical axis in a manner different from that in the first prior art disclosure referred to above. By the above arrangement, the problem related to the side pressures exerted on the gears and bearings in the first prior art may be eliminated, but other drawbacks still remain approximately the same.

Incidentally, in the previously described single lens reflex camera which is provided with an interchangeable lens and is capable of effecting automatic focusing, the driving power must be positively transmitted from the driving member to the driven member so that the automatic focusing function is preformed in a correct and accurate manner. Since the efficiency, such as the speed for transmission, etc., largely affects the time required for the automatic focusing step, it is an important factor for the reduction in the photographing time.

However, in actual practice there is a situation which can occur is herein the mechanical coupling between the driving member and the driven member is faulty, for example, when the attachment of the interchangeable lens barrel with respect to the camera body is imperfect, and if the photographing is effected without being aware of such a faulty coupling, the picture taken may be ruined because the automatic focusing will not have been sufficiently performed. Meanwhile, when the attachment of the interchangeable lens is imperfect, there may also arise an unexpected unsteadiness or looseness in the mounting. In such cases, the intended transmission efficiency; even if the transmission is effected somehow, is considerably lowered, and a long period of time is undesirably required for the automatic focusing. These problems related to the reduction in performance during photographing may result in a loss of reliance by users with respect to the optical instrument.

Conventionally, warning means with respect to such faulty attaching of the interchangeable lens have been proposed, for example, in U.S. Pat. No. 4,130,358, etc., according to which, apart from the problem related to mechanisms for detecting the state of attachment of the interchangeable lens, at least the disadvantage that the auto-focusing becomes insufficient due to faulty attachment of the interchangeable lens with respect to the camera body may be eliminated. However, even with the above arrangement it is still impossible to determine whether the coupling between the driving member and driven member is improper, in spite of the fact that the attachment of the interchangeable lens is perfectly made, and accordingly, there still remains the problem that the photographing may be effected with the insufficient coupling not being corrected.

Furthermore, in the camera body and interchangable lens barrel, proper connection and power transmission therebetween are to be effected by restriction in the mounting positions through engagement of a locking portion at the camera body side and a portion to be locked at the side of the lens barrel, provided at the mounting portions thereof for accurate correspondence between the driving member and driven member earlier described.

However, owing to a slight looseness in the fitting at the mounting portions, even when the locking is perfectly made, there tends to be an eccentricity between the camera body and lens barrel with respect to the locked portion, with a consequent positional deviation at the connected portion between the driving member and driven member to that extent. Since the positional direction as described above reduces the driving efficiency with respect to the driven member, not only the time required for automatic focusing is prolong, but power consumption by the driving device is also increased. Moreover, depending on the degree of looseness in the mount fitting and transmission system from the driving member to the driven member, the automatic focusing function may be made still more unstable.

Since the problems as described in the foregoing are those which take place after the mounting has been sufficiently effected, they can not be solved even by the means for detecting the degree of fitting at the mount portions as disclosed in the U.S. Pat. No. 4,130,358 referred to earlier, and there have been proposed no arrangements up to the present that are capable of fully eliminating such problems.

SUMMARY OF THE INVENTION

Accordingly, a primary object of the present invention is to provide an optical system interchangeable type optical instrument which is capable of eliminating various problems inherent in the conventional arrangements as described in the foregoing.

Another object of the present invention is to provide a driving force transmitting device for use in an optical instrument which occupies only a small space and does not readily produce unnecessary pressure and abrasion during transmission, with less reduction in the transmission efficiency, through substantial elimination of drawbacks in the prior art arrangements of this kind.

A further object of the present invention is to provide a circuit open/close arrangement which is capable of positively detecting proper or improper states of coupling between a driving member and driven member, for example, by giving warnings, with a consequent correspondence thereof with proper or improper mounting of the optical instrument for elimination of the conventional problems.

A still further object of the present invention is to provide an optical instrument in which, even when an interchangeable optical instrument becomes eccentric to the main optical unit with respect to the locked portion in the mounted state, owing to loose fitting at the mount portions between the optical instrument main body and interchangeable optical instrument, proper coupling is still achieved between the driving member and the driven member and no reduction in the driving efficiency for the driven member or any inaccurate driving will occur.

The present invention is characterized in that in the optical system interchangeable type optical instrument, for selective mounting or dismounting between an optical instrument-constituting element provided with a driving member and another optical instrument constituting element equipped with a driven member to be connected to the driving member, the driving shaft and a driven shaft are so disposed that their rotary axes are located on the same axis parallel to an optical axis, thereby to positively transmit the driving force through meshing engagement between respective end faces abutting on the same axis as described above.

It is another object of the present invention to provide a transmission device of driving force which is so arranged that, in an optical system interchangeable type optical instrument, for selective mounting or dismounting between an optical instrument-constituting element provided with a driving member and another optical instrument-constituting element equipped with a driven member to be connected to the driving member, the driving member is adapted to be movable between the connected and disconnected positions thereof with respect to the driven member, i.e., between the connected position and cut-off position of the driving and driven members, so that a circuit is opened, or opened and closed, when the driving member is located in a position where proper connection thereof with respect to the driven member may be achieved.

It is still another object of the present invention to provide an arrangement for effecting a precise mounting between an optical unit and an interchangeable optical system instrument, which is so arranged that, in the interchangeable optical system instrument selectivity attachable or detachable with respect to the optical unit, a connected portion to be driven of a driven member provided on the interchangeable optical system instrument is installed within a mounting position restricting portion provided at the attaching and detaching mounting portion or thereabout.

BRIEF DESCRIPTION OF THE DRAWINGS

These and other objects and features of the present invention will become more apparent as the description proceeds in conjunction with the preferred embodiment thereof with reference to the accompanying drawings, in which;

FIGS. 11 and 12 are schematic diagrams showing embodiments wherein the connecting portion for the driven member is provided in the vicinity of a portion to be locked for the mount, in which.

DETAILED DESCRIPTION OF THE PREFERRED EMBODIMENTS

The embodiments as installed show the interchangeable lens barrel for photographing purposes as one example of an interchangeable optical instrument provided with an optical system moving device for supporting the optical system movably or at a predetermined position. Meanwhile, the example of the optical instrument main body provided with the driving device for controlling the movement of the above described optical system, is represented by the photographic camera itself.

Figure 1:
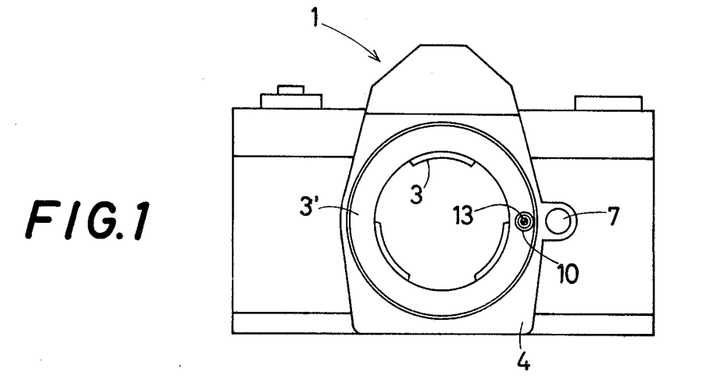
FIG. 1 is a schematic front elevational view of a photographic camera according to one preferred embodiment of the present invention.

Referring now to the drawings, there is shown in FIG. 1 a main body 1 of a photographic camera to which the present invention may be applied, in which a mounting ring member 3' having bayonet pawls 3 provided in the inner periphery of an opening for mounting (attaching or connecting) an interchangeable lens barrel in a known manner, is fixed to a cover member 4 extending outwardly to the front portion of the camera body 1 from a dark room portion thereof. The camera body 1 is provided with a mount releasing button 7 and a positioning portion 10 at a forward end of a cylindrical mount positioning member 9 (to be described later). The positioning portion 10 is inserted into an opening formed in the ring member 3' from the inner side of the camera body 1, and is normally urged in a direction projecting from the front face of the mount portion by a spring 8 (to be described later). Further provided on the camera body side is a driving shaft 13 as a driving member, the outer periphery of which fits within the mount positioning member 9 with a certain looseness, i.e., its outer diameter is less than the inner diameter of the mount positioning member 9. The reason for providing such looseness is to absorb any deviation of the axis with respect to a driven shaft 60 at the side of the interchangeable lens barrel 2 to be mentioned later, based on dimensional errors of the parts and mounting errors between the camera body and interchangeable lenses, etc. In FIG. 1, the forward end portion of the driving shaft 13 is visible, with an abutting or engaging pawl 17 (its numeral not shown in FIG. 1) to be mentioned later being further formed at the forward end face thereof.

Figure 2:
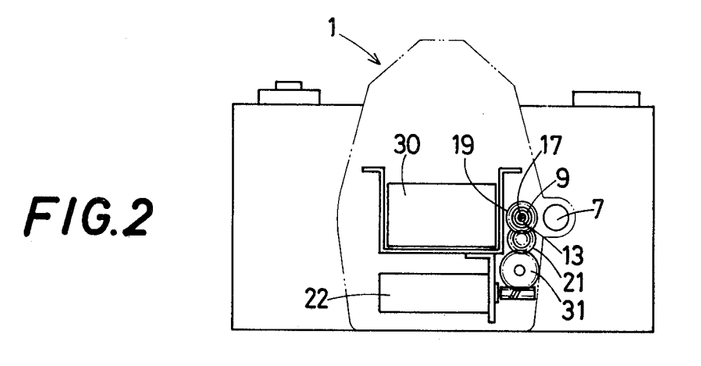
FIG. 2 is a view similar to FIG. 1 and partly broken away for showing a transmission mechanism incorporated in the interior of the photographic camera of FIG. 1.

Referring to FIG. 2, there are shown a motor 22 and a train of transmission gears associated therewith which are provided in the camera body 1. By way of example, the motor 22 is disposed below a reflecting mirror 30, and the rotation of the motor 22 is transmitted to a gear 21 through an intermediate gear train 31, etc., and further, to a gear 19 secured to the driving shaft 13 earlier mentioned for rotating the driving shaft 13.

Figure 3:
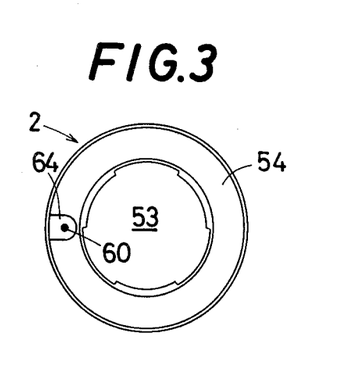
FIG. 3 is a rear side view of an interchangeable lens barrel according to one preferred embodiment of the present invention.

FIG. 3 shows an interchangeable lens 2 as viewed from its rear side, i.e., from the side thereof mountable on the camera body. Numeral 54 shows an annular seat member on the side of the lens to be mounted on the mounting and dismounting mount ring 3' at the side of the camera 1, while numeral 53 denotes a rear lens group provided in its interior. There is provided a mounting positioning recess 64 which opens toward the outer periphery of the annular seat member 54, and upon fitting of the positioning portion 10 of the mount positioning member 9 on the side of the camera 1 into the recess 64, locking is established therebetween at this position. A driven shaft 60 is arranged to be inserted into a through-opening provided in the mount positioning recess 64, and to be directed, at its forward end, towards the surface of the mounting and dismounting mount 54 earlier mentioned, and thus, to function as a driven member with respect to the driving shaft 13.

Figure 4:
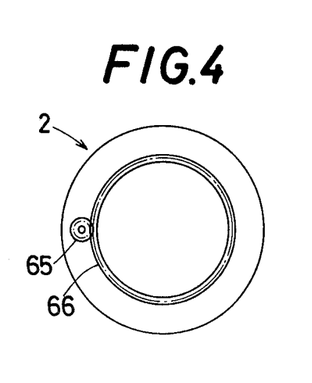
FIG. 4 is a schematic diagram showing a transmission mechanism arranged in the interior of the interchangeable lens barrel of FIG. 3.

Reference is made to FIG. 4 which shows a train of transmission gears provided in the interior of the interchangeable lens barrel 2. More specifically, in the above arrangement a gear 66 secured to an intermediate helicoidal cylinder 58 (to be described later) for advancing or retreating an inner cylinder 59 (to be mentioned later), in which a group of lenses is secured, is in mesh with another gear 65 fixed to the driven shaft 60 for simultaneous rotation therewith.

Figure 5:
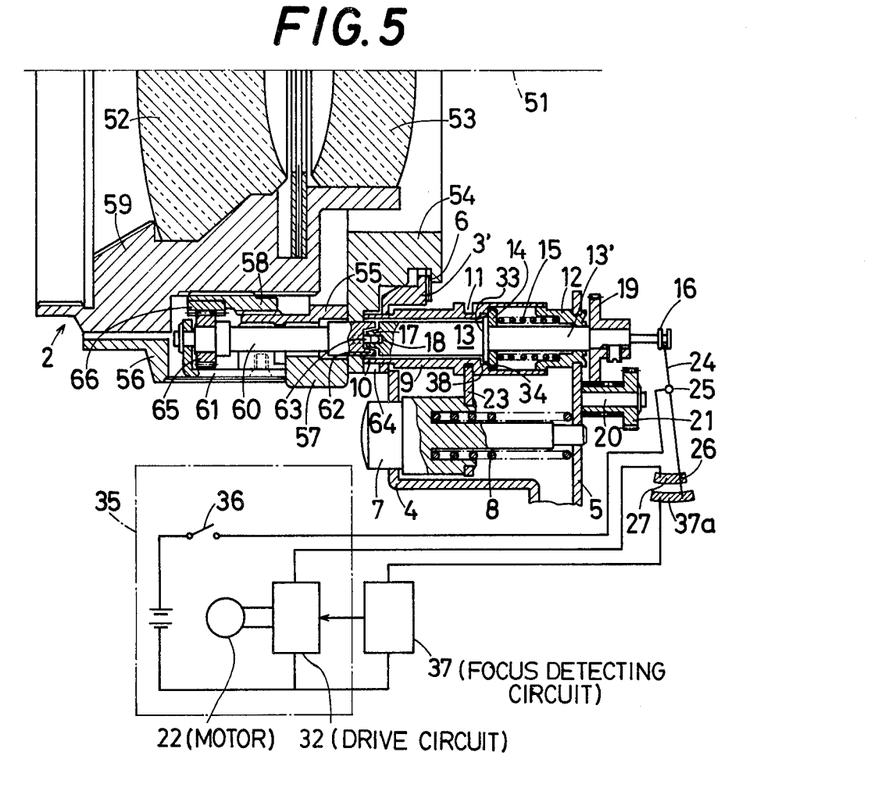
FIG. 5 is a longitudinal sectional view of the photographic camera of FIG. 1 showing, on an enlarged scale, the state where the interchangeable lens barrel is mounted at its front side, with simultaneous representation of a focusing driving circuit for the interchangeable optical instrument coupled therewith.

FIG. 5 shows a state in which a camera 1 and the interchangeable lens 2 described so far are perfectly connected to each other, such that the driving shaft 13 and the driven shaft 60 are coupled to each other, while a pin 63 formed in the engaging recess 62 at the forward end of the driven shaft 60 is further fitted into a pivot opening 18 formed in the abut pawl 17 at the distal end of the driving shaft 13 for a consequent alignment of the axes, with a circuit switch (to be mentioned later) connected to the motor 22 and a motor drive control circuit 32 being in an "ON" state.

In FIG. 5, respective portions of the interchangeable lens 2 are denoted by numerals larger than 50, and include in a known manner a front lens group 52 and a rear lens group 53 which are fixed to the interior of the inner cylinder 59. Provided between an outer cylinder 56 and the inner cylinder 59 are the driven shaft 60 for the driving shaft 13 in the camera and a lens advancing mechanism. In a bearing 61 fixed to the outer cylinder 56 described earlier, one end of the driven shaft 60 is journalled. A gear 65 is secured to the driven shaft 60, and is in mesh with another gear 66 fixed to the outer periphery of the intermediate helicoidal cylinder 58. An outer helicoidal cylinder 55 secured to the annular seat member 54 for the mount. There is further provided a rotatable operating ring 57. The straight forward advancing of the lenses 52 and 53 is effected by receiving rotational force of the gear 65 through the outer helicoidal cylinder 55, intermediate helicoidal cylinder 58 inner cylinder 59, and further, through known linear key pins and corresponding guide grooves formed in the above cylinders, although not specifically shown here.

The driven shaft 60 disposed in parallel to the the optical axis 51 of the lens extends, at its forward end portion, rearwardly through the through-opening forced in the mount annular seat member 54, with the distal end of the shaft 60 being positioned in the mount positioning recess 64. At the end face of the driven shaft 60, the engaging recess 62 is formed so as to correspond to the abut pawl 17 of the driving shaft 13 at the side of the camera 1, thus forming an engaging clutch between the abut pawl 17 and the recess 62. In the engaging recess 62, there is further formed a projecting pin 63 in alignment with the axis of the driven shaft 60. The pin 63 is arranged to be fitted into the pivot opening 18 formed in the abut pawl 17 of the driving shaft 13.

Subsequently, the constructions on the side of the camera 1 will be described.

The mount ring member 3' on the side of the camera 1 on which the interchangeable lens 2 is to be mounted has a plate spring 6 provided at its rear side for effecting coupling without any side play or looseness during coupling thereto of the interchangeable lens 2. The mount releasing button 7 extending from the front cover 4 at its one portion is supported between the front cover 4 and a camera front wall plate 5 at the inner side, and is normally urged to project from the front cover 4 by the spring 8 loaded at its rear end. An engaging plate 23 is secured to the rear shaft portion of the mount releasing button 7, and is adapted to be engaged with a circumferential groove 11 of the mount positioning member 9, and therefore, the releasing button 7 and the positioning member 9 may be operated as one unit in the direction of the optical axis of the camera. The mount positioning member 9 is formed into a cylindrical configuration. By the insertion of the forward end positioning portion 10 thereof into the through-opening of the mount ring member 3' on the camera side, and also by the fitting of the rear end cylindrical portion over the outer periphery of the bearing member 12 of the driving shaft 13, the mount positioning member 9 is held for selective advancing and retreating as desired in the direction of the optical axis of the camera. The bearing member 13 described above is attached to an opening of the front wall plate 5 of the camera.

A movable flange 14 is slidably fitted into a rear half portion of the driving shaft 13, and is normally urged in the forward direction of the camera by a spring 15 provided therearound. Meanwhile, a flange 33 is fixedly provided on the driving shaft 13, and by the pressure contact of the movable flange 14 against the fixed flange 33, the driving shaft 13 is urged leftwards by the urging force of the spring 15. In the above case, the movable flange 14 pushes the fixed flange 33 for movement in the leftward direction, but in the end stage of the above stroke, the movable flange 14 is brought into contact with a second inner diameter enlarged stepped portion 34 of the mount positioning member 9, and consequently no further urging force in the leftward direction is applied to the fixed flange 33. Accordingly, in the above state, the driving shaft 13 may be smoothly rotated without receiving, at its fixed flange 33, the pressure of the movable flange 14 by the spring 15. The driving shaft 13 is not movable into the mount positioning member 9 beyond the position where the fixed flange 33 of the driving shaft 13 contents a first inner diameter enlarged stepped portion 38 (which is adjacent to the second inner diameter enlarged stepped portion 34 described earlier) of the mount positioning member 9.

The abut pawl 17 is at the formed end of the driving shaft 13 to the project from the end face for fitting into the engaging recess 62 of the driven shaft 60 for the interchangeable lens 2. Furthermore, at the forward end face of the abut pawl 17, an engaging opening 18 is formed in alignment with the axis of the driving shaft 13. The engaging opening 18 is intended to correctly align the axes of the driving shaft 13 and driven shaft 60 by receiving therein the projecting pin 63 of the driven shaft 60.

In FIG. 5, the driving circuit 35 generally includes the motor 22, a motor drive control circuit 32, a switch 36, and a circuit for connecting another switch including a fixed electrode 27 and movable electrode 26. The switch 36 is arranged to be opened and closed, for example, in the association with a shutter releasing (not shown), and the whole circuit 35 is rendered to be "OPERATIVE" by the turning "ON" of the switch 36 under the contacting state between the fixed electrode 27 and the movable electrode 26 for effecting the driving of the motor. A distance measuring circuit or focus detecting circuit 37 is connected to the driving circuit 35 so as to utilize the power source in the driving circuit 35 as the common power source, and is so arranged that the functioning thereof is controlled by a switch including the movable electrode 26 and another fixed electrode 37a slidable with respect thereto. The second fixed electrode 37a is formed to be a slightly longer in length than said first fixed electrode 27 so as to make it possible to turn "on" only the distance measuring or focus detecting circuit, even driving circuit is "INOPERATIVE" state. With respect to the fixed electrode 27 provided at one end of the driving circuit 35, a switch lever 24 pivotable about a point 25 is provided. The other end of the switch lever 24 is engaged with an annular groove 16 formed in the rear end of the driving shaft 13. Accordingly, the switch lever 24 is pivoted, following the advance or retreatment of the driving shaft 13, and at a proper pivoting position thereof the movable electrode 26 at the forward end of the switch lever 24 is to be brought into contact with the fixed electrode 27 and 37a. To the switch lever 24, the other one end of the circuit 35 is connected. The connection between the fixed electrode 27, 37a and movable electrode 26 is effected by the fitting of the mount positioning member 9 into the mount positioning recess 64, regardless of establishment of the clutch connection by the abut pawl 17 and the engaging recess 62 (see FIGS. 8 and 5). On the other hand, in the state where the mounting of the interchangeable lens 2 onto the camera is not completed (see FIGS. 6 and 7), the movable electrode 26 is spaced from the fixed electrode 27, 37a.

In the case where the optical lens system of the camera is provided with a mechanism for indicating in focused and non-focused state, for example, within a view finder, the above arrangement has such an advantage that, even when an interchangeable lens provided with no construction for the automatic-focusing as shown in FIG. 5 (i.e., an ordinary lens capable of only manual focusing) is mounted on the camera, the focusing operation is readily effected by the indication mechanism, if the distance measuring circuit is kept functioning. The length of the second fixed electrode 37a described previously is formed to be slightly longer so as to cause only the distance measuring or focus detecting circuit 37 to function for the purpose as described above.

Figure 6:
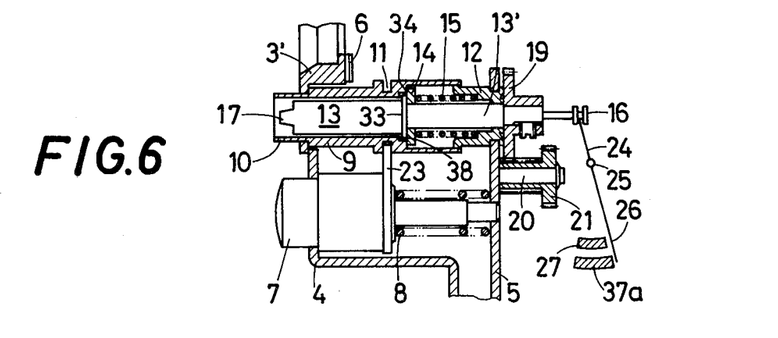
FIGS. 6 to 8 are views similar to FIG. 5, but particularly show the sequence for mounting of the interchangeable lens barrel.
Figure 7:
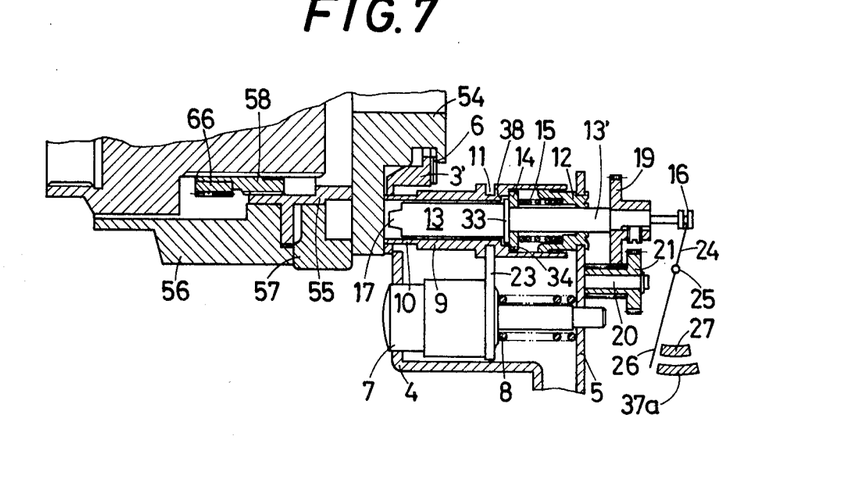

In the above case, it is of course necessary that, in the ordinary interchangeable lens, the positioning recess (FIGS. 3 and 6) for loading the mount to the camera is formed to be slightly deep more than the recess 64 of the interchangeable lens (FIG. 5) equipped with the automatic-focusing mechanism.

In the case where an interchangeable lens outside the assurange range for the distance measuring performance by the distance measuring or focus detecting circuit 37, for example, an ultra-telephoto lens, is mounted on the camera body there is a possibility that an inaccurate distance measurement or an inaccurate detection is effected, and the result of such faulty measurement is undesirably displayed. With respect to such lens outside the distance measuring performance assurance range, it may be so arranged, for example, that, with a projection formed in position of the positioning recess 64, for thrusting the driving shaft 13, the movable electrode 26 is fully deflected through the driving shaft 13, so as not to contact either of the two fixed electrodes 27 or 37a.

Meanwhile, the distance measuring or focus detecting circuit 37 is arranged to input the focused information for an object to be photographed into the motor drive control circuit 32, whereby the circuit 32 controls the rotational direction and the member of revolutions of the motor 22 for driving the motor. The rotation of the motor 22 is transmitted, through the intermediate gear train 31 (see FIG. 2), to the gear 21 provided on the front wall plate 5 of the camera, and further, the rotation of the gear 21 is transmitted to the gear 19 secured to the driving shaft 13, thereby to rotate the driving shaft 13 by a predetermined number of rotations. In FIGS. 5 to 8, a shaft for the gear 21 is fixed to the front wall plate 5.

Now, the functioning of the arrangement described so far will be explained. When the interchangeable lens 2 is rotated to the position where the mount positioning recess 64 of the interchangeable lens 2 has come around up to the position of the mount positioning member 9 of the camera 1, while the ring 54 of the interchangeable lens 2 is being pressed onto the mounting ring member 3' of the camera in the state as in FIG. 6 against the force of the springs 8 and 15 (FIG. 7), the positioning portion 10 of the mount positioning member 9 automatically goes into the positioning recess 64 by the pressure of the springs 8 and 15 (see FIG. 8), whereby the interchangeable lens 2 is mounted and locked at the predetermined position with respect to the camera 1. Simultaneously, the movable electrode 26 comes into contact with the fixed electrode 27 and the switch at this portion of the driving circuit is brought into the "OPERATIVE" state.

Figure 8:
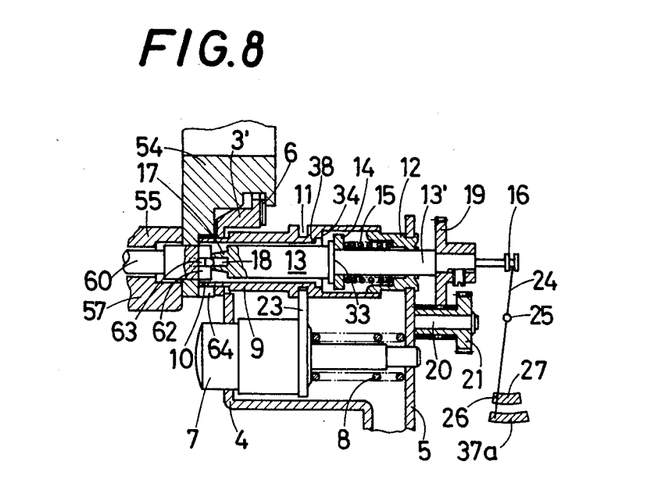

On the other hand, at the above point in time, the abut pawl of the driving shaft 13 is not necessarily in mesh with the engaging recess 62 of the driven shaft 60. FIG. 8 shows such a state as referred to above. In the above state, although the engagement between the mount positioning member 9 and the mount positioning recess 64 is completed, the driving shaft 13 can be retreated towards the left farther than the mount positioning member 9 against the pressure of the spring 15.

Upon starting of rotation of the motor 22, the driving shaft 13 also starts rotation, and at an instant at which the positions of the abut pawl 17 and engaging recess 62 as the clutch for the driven shaft 60 have been aligned with respect to each other, engagement of the clutch is completed, and thus, the driving force is to be transmitted to the side of the interchangeable lens (FIG. 5). In the above case, it is needless to say that the projecting pin 63 is also fitted into the engaging opening 18, with the axes of both of the shafts 13 and 60 being aligned.

In FIG. 5, upon input of the signal from the distance measuring circuit 37 into the motor drive control circuit 22, with the switch 36 closed, the motor 22 is rotated, and thus, the driving shaft 13 is rotated through the intermediate gear train 31, and gears 21 and 19. The rotation of the driving shaft 13 is transmitted to the driven shaft 60 through the clutch constituted by the abut pawl 17 and the engaging recess 62, and further rotates the intermediate helicoidal cylinder 58 through the gears 65 and 66. Following the above rotation, the lens groups 52 and 53 are moved in the direction of the optical axis 51. After movement of the lens groups 52 and 53 by the signals for rear focus and front focus from the distance measuring circuit 37, the motor 22 is stopped through focusing detection by the distance measuring circuit 37 and the lens groups 52 and 53 are also stopped, and thus, the automatic focusing functioning is completed.

For dismounting or disengaging the interchangeable lens 2, the mount positioning member 9 is retreated by depressing the mount releasing button 7. In the above case, the driving shaft 13 is also retreated together at the same time by the first inner diameter enlarged stopped portion 38 of the member 9 for the disengagement between the abut pawl 17 and engaging recess 62, and thus, by turning the interchangeable lens 2 with respect to the camera 1, the lens 2 can be detached or dismounted from the camera.

Figure 9:
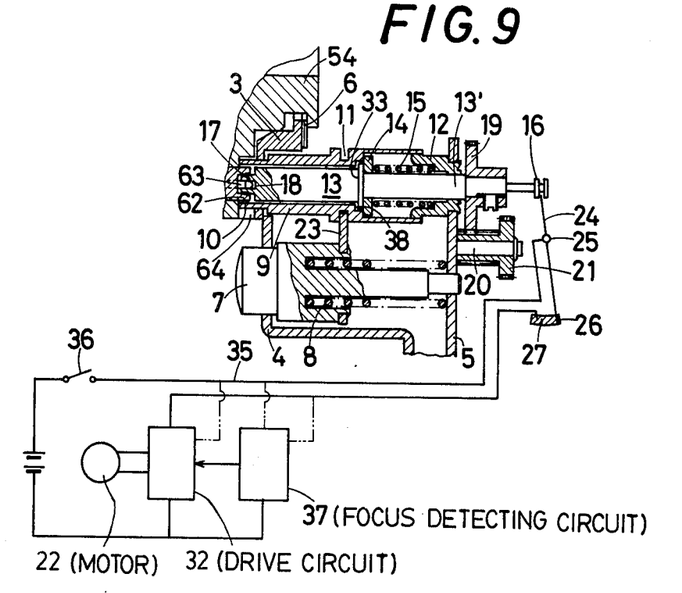
FIG. 9 is also a view similar to FIG. 5, but particularly shows one example in which a warning circuit is applied thereto for indication of imperfect coupling between a driving member and a driven member.

Reference now is made to FIG. 9 showing a modification of the driving circuit as shown in FIG. 5. It is to be noted that like parts in FIG. 5 are designated by like reference numerals in FIG. 9 for brevity of description.

In the arrangement in FIG. 5, the movable electrode 26 for actuating the whole driving circuit 35 is described as provided with the first fixed electrode 27 and the second fixed electrode 37a. Meanwhile, in the embodiment of FIG. 9, the arrangement is so made as to effect the predetermined functions only by the fixed electrode 27.

In the above arrangement of FIG. 9, the switch 36 is arranged to be turned "ON" or "OFF" for example, in association with the shutter release (not shown), and the whole driving circuit 35 is actuated by the turning "ON" of the switch 36 in the contact state between the fixed electrode 27 and movable electrode 26 for driving the motor 22 in the similar manner as in the arrangement of FIG. 5. Additionally, the switch 27 is provided at one end of the driving circuit 35, while the switch lever 24 pivotable about the point 25 with respect to the fixed electrode 27 is provided also in the similar fashion as in FIG. 5.

Figure 10:
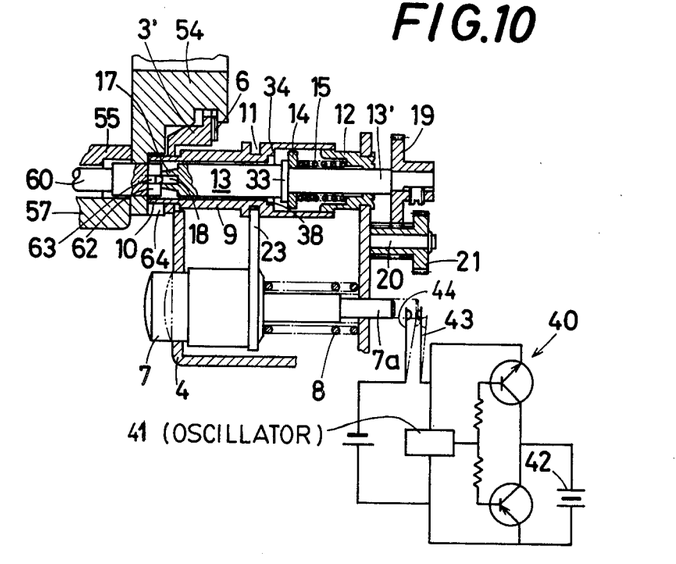
FIG. 10 is a view similar to FIG. 5, but particularly shows a modification of the driving circuit for effecting focusing of the interchangeable optical instrument.

Referring further to FIG. 10, there is shown an embodiment in which a warning circuit 40 for warning incomplete coupling between the camera and interchangeable lens is provided in the foregoing embodiments.

The warning circuit 40 includes an oscillator 41 and a sound producing element 42. A pair of switch pieces 43 and 44 are provided to confront the rear end 7a of the mount releasing button 7 so as to be turned "ON" or "OFF" following the advance or retreatment of the releasing button 7 associated with the mount positioning member 9. More specifically, during mounting of the interchangeable lens 2 onto the camera body 1, if the positioning portion 10 of the mount positioning member 9 has not been fitted into the mount positioning recess 64, the releasing button 7 is in the retreated position as shown in the imaginary line, and therefore, the switch pieces 43 and 43 are closed to emit the warning in the form of a sound or voice. In the case where the positioning portion 10 is fitted into the mount positioning recess 64 as shown in the solid line, the releasing button 7 is advanced, and thus, the switch pieces 43 and 43 are opened to open the circuit for stopping the warning sound. Of course, at the time point where the interchangeable lens 2 is not mounted, the releasing button 7 is kept pushed forward by the spring 8, and therefore, the switch pieces 43 and 43 are held in the opened state.

In the above embodiment, the warning is to be emitted during the period from the starting of mounting of the interchangeable lens 2 onto the camera body 1 to the establishment of the positively connected state between the driving shaft 13 and the driven shaft 60 upon completion of the mounting.

It is to be noted here that, in the foregoing embodiment, the driving shaft 13 and the driven shaft 60 are arranged to be connected to each other by the engagement of the linear abut pawl 17 and the engaging recess 62 provided in their abutting end faces. Even when the state of proper connection has been reached, the actual engagement is not established if the abut pawl 17 and the engaging recess 62 are crossing each other, and for actually establishing the connected state, it is so arranged that the driving of the driving shaft 13 is started in the connectable state as described earlier so as to align the abut pawl with the recess in the orientation thereof. However, in the case where the clutch type employed for the driving shaft and the driven shaft is such that the engagement of the clutch is established by the direct abutting of the clutch faces thereof, the arrangement as described earlier is not required, and the opening and closing of the switch is to exactly correspond to whether the connection is proper or not.

According to the embodiment of FIG. 10, in the optical system interchangeable type optical instrument equipped with the driving shaft and the driven shaft which are provided on one part and the other part of the optical instrument engageable and disengageable with respect to each other so as to be connected and disconnected following the engagement and disengagement between the one part and the other part, there is provided the switch which selectively open or close the circuit depending on whether the clutch for the shafts is in the state for proper connection or not, and therefore, it is possible to give warning in the form of a sound or voice during faulty connection of the clutch arising from the looseness or side plays in the mounting as well as from improper mounting of each part of the optical instrument. Accordingly, failures and inconvenience resulting from use of the optical instrument in the non-connected or faulty state are positively prevented, while it is possible to urge the user to properly correct the state of connections.

In the embodiments of FIG. 1 through FIG. 10, there has been shown the arrangement in which the driving shaft is arranged concentrically with the mount positioning member in the camera, while the driven shaft is arranged concentrically with the mount positioning recess in the interchangeable lens. On the contrary, in the embodiment as shown in FIGS. 11 and 12, the driving shaft and the driven shaft are provided concentrically with the mount positioning means, but provided in the vicinity of the mount positioning means.

Figure 11:
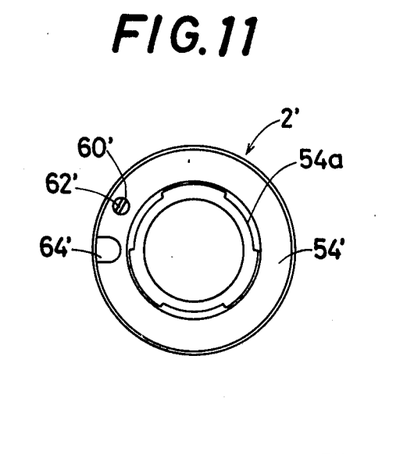
FIG. 11 is a rear side view of an interchangeable lens barrel and FIG. 12 is the schematic diagram showing the transmission mechanism arranged in the interior of the interchangeable lens barrel.

Referring to FIG. 11, the interchangeable lens 2' as observed from its reverse side includes a ring 54' to be mounted, bayonet lugs 54a, a mount positioning recess 64' which is the portion to be locked for mounting the interchangeable lens 2'. a driven shaft 60' provided in a position having a slight rotational angle (approximately 30° in this embodiment) about the optical axis of the interchangeable lens, with respect to the recess 64', and an engaging recess 62' formed at the forward end of the driven shaft 60'. FIG. 12 shows the train of transmission gears provided within the interchangeable lens 2, in the similar manner as in FIG. 4, and includes a gear 65' for the second driving shaft 60' and another gear 66' secured to the intermediate helicoidal cylinder. It will be seen that, from the embodiment of FIGS. 1 through 8, the embodiment shown in FIGS. 11 and 12 is different only in that the driven shaft 60' is not concentrically or coaxially provided within the recess 64', but is disposed in the vicinity thereof. The position in the vicinity of the mount positioning means stands for surrounding neighborhood about the mount positioning means (i.e. the mount positioning recess 64' in the interchangeable lens 2''). Accordingly, the case where the driving force disconnecting and connecting position (i.e., the forward end of the driven shaft 60' in the interchangeable lens 2') is located at an inner or outer side with respect to the position to be locked (i.e., the recess 64'), is also included. The relation between the position of the mount positioning means position of the driving and driven shaft is largely related to the deviation of axes between the driving shaft and the driven shaft to be coupled therewith, with respect to the driving force transmission. This situation will be explained with reference to FIG. 13, which shows the state where the mounting and dismounting mount of the interchangeable lens is mounted on the corresponding mounting and dismounting mount of the camera, with the solid line representing the state in which there is no looseness or side plays in the mounting. Meanwhile, the states illustrated by the one-dot chain line and two-dot chain line respectively show the state where the interchangeable lens is deviated upward by $\Delta\theta$ and the state where it is deviated downward by $\Delta\theta$ in the drawing. The second driving shaft 60' is provided in a position A in the vicinity (i.e., the position spaced more or less than in the case of FIG. 11, and having a rotational angle of about 45° with respect to the recess 64') of the mount positioning recess 64'. With respect to the above, there is shown an example in which a driven shaft 70 is provided in a position B spaced far apart from the mount positioning recess 64' for comparison. In the diagram of FIG. 13, numeral 54a indicates the outer diameter of the mounting and dismounting mount at the side of the interchangeable lens 2, while numeral 3a shows the inner diameter of the mounting and dismounting mount at the camera side.

Now, on the assumption that the looseness or side plays of the interchangeable lens is denoted by $2.\Delta\theta$, with deviations by $\Delta\theta$ respectively upward and downward from the proper position, since the fixing point of the interchangeable lens is at the mount positioning recess 64' which is the portion to be locked with respect to the camera, deviations take place upward and downward through the rotational angle $\Delta\theta$ from the proper position (solid line) about the recess 64'. In the case of the driven shaft represented by numeral 70 for comparison, a deviation takes place, due to the above deviation, by a distance $\Delta$IB in the circumferential direction about the optical axis 51' as a center. Meanwhile, in the case of the driven shaft 60' provided in the vicinity of the mount positioning recess 64', the deviation about the optical axis 51' by the same deviation angle $\Delta\theta$ is represented by $\Delta$lA. In other words, the difference between $\Delta$lA and $\Delta$IB is clear and self-explanatory even on the drawing.

Figure 12:
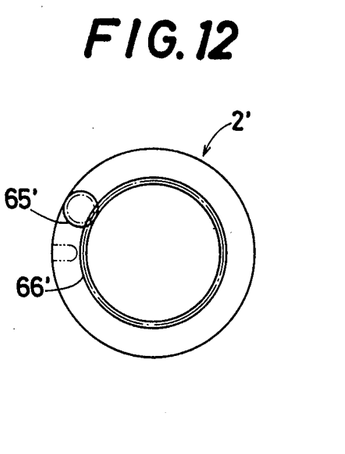
Figure 13:
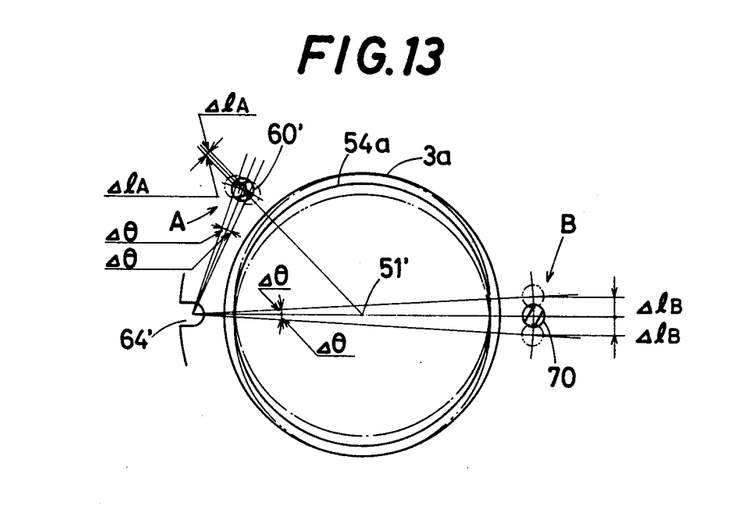
FIG. 13 is a diagram showing a comparison of deviations in the axis of a transmission shaft in cases where the driven member connecting portion is provided in the vicinity of the portion to be locked and where the portion is provided in a position remote therefrom.

The effects of the embodiment of FIGS. 11 and 12 are as follows.

Since the clutch connected portion for the driven shaft is provided within the portion to be locked for the mount positioning restriction or in the vicinity thereof, even when the interchangeable optical instrument becomes eccentric with respect to the main optical unit, the positional deviation of the above connected portion with respect to the driving connecting portion in the main optical unit is completely eliminated or becomes very small, and thus, the connection between the driving shaft and the driven shaft is properly effected, without any possibility of reduction in the driving efficiency or uncertain driving.

In claims as appended herewith, the position restricting means for maintaining, at the predetermined relation, the mutual positions of the interchangeable optical instrument and the optical instrument main body, denotes the positioning portion 10 including the engaging recess 64 and the cylindrical member at the forward end of the mount positioning member 9 extending outwardly from the opening in the front cover 4 of the camera 1.

The position restricting means as described above further includes the engaging plate 23 fixed to the rear end of the mount operating button 7 related to the circular groove 11 at the outer periphery of the above positioning member 9 in which the positioning portion 10 is formed, and the spring 8 exerted on the mount operating button 7.

Meanwhile, the engaging and disengaging means for selective connection or cut-off of the earlier described clutch by subjecting the driving shaft to relative movement in the direction of the optical axis of the optical system, includes the fixed flange 33 provided on the driving shaft 13 movable inside the mount positioning member 9, the first inner diameter enlarged stepped portion 38 formed in the inner periphery of the positioning member at the forward portion of the fixed flange 33, the movable flange 14 fitted into the small diameter shaft portion 13' of the driving shaft 13 in a position adjacent to the rear portion of the fixed flange 33, the second inner diameter enlarged stepped portion 34 of the mount positioning member 9, and further, the spring 15 supported by the small diameter portion 13' between the movable flange 14 and the front wall 5 of the camera.

The engaging and disengaging means for subjecting the above-described clutch to connection or cut-off is accompanied by the mount positioning member 9 when the mount releasing button 7 is projected outwardly from the front cover 4 by the action of the spring 8, and urges the clutch into the connected stage by causing the first inner diameter enlarged stepped portion 38 of the member 9 to space from the fixed flange 33 of the driving shaft 13.

The projecting member is equivalent to the forward end portion 10 of the mount positioning member 9 in the case of the embodiment, and the member is arranged to be selectively projected from or retreated into the mounting ring 3' of the camera in association with the movement of the mount releasing button 7 of the camera as described previously.

In the foregoing embodiment, the position restricting means may be of a member provided to extend outwardly from the interchangeable optical instrument, and a recess formed in the main body for engagement with said projecting member. Similarly, devices for releasing the engagement of the position restricting means may be provided on the interchangeable optical instrument. Furthermore, connection or cutting-off of the clutch means can also be effected by the movement of the driven shaft.

It should be noted here that the terms in the appended claims are employed as concepts representing items as follows.

Interchangeable type optical unit:

Still camera (as shown in the embodiments), projector (projecting unit), enlarger, enlarging apparatus.

Interchangeable optical instrument:

Extension ring, conversion lens, bellows for still camera, lens assembly for projector, lens assembly for enlarger.

Optical instrument main body:

Still camera main body, projector main body, enlarger main body.

It should further be noted that the present invention is also applicable to optical systems of industrial TV cameras.

While the present invention has been described in detail in the preferred embodiments thereof with reference to the attached drawings, it is to be understood that various modifications and variations will be apparent, and therefore, that the present invention is not limited thereto, but may be otherwise variously embodied within the scope of the following claims.

What is claimed is:

1. An optical apparatus employing an automatic focusing system comprising:
   an optical instrument main body having driving means for automatic focusing operation;
   an interchangeable optical instrument releasably mounted on said main body and having an optical system defining an optical axis and driven means driveable by said driving means for moving the optical system;
   position restricting means for restricting mutual positions of said interchangeable optical instrument and said main body when said interchangeable optical instrument is mounted on said main body;
   a rotatable driving shaft provided in said main body so as to extend in parallel with said optical axis of said optical system and connected to said driving means to be rotated thereby;
   a rotatable driven shaft extending in parallel with said optical axis of said optical system and connected to said driven means for driving the same and disposed in said interchangeable optical instrument to align with said driving shaft when said interchangeable optical instrument is mounted on said main body;
   clutch portions provided on respective end faces of said driving shaft and said driven shaft confronting each other so as to be connected with each other;
   supporting means for supporting said driving shaft movably between a connecting position where said clutch portions are connected with each other and a disconnecting position where said clutch portions are disconnected from each other;
   urging means for urging said driving shaft to said connecting position when said interchangeable optical instrument is mounted on said main body; and
   manual operating means operable for moving said driving shaft to said disconnecting position.

2. An optical apparatus employing an automatic focusing system as claimed in claim 1, wherein said manual operating means includes releasing means for releasing the restriction of said position restricting means in association with the operation of said manual operating means.

3. An optical apparatus employing an automatic focusing system as claimed in claim 2, wherein said position restricting means includes a projecting member projection in the direction of the optical axis from said main body and a recess formed in said interchangeable optical instrument so as to receive said projecting member thereinto.

4. An optical apparatus employing an automatic focusing system as claimed in claim 3, wherein said driving shaft and said driven shaft are disposed in the vicinity of said position restricting means so that the deviation of axes between said driving shaft and said driven shaft is reduced with said interchangeable optical instrument mounted on said main body.

5. An optical apparatus employing an automatic focusing system as claimed in claim 3, further comprising aligning means provided on the end faces of said driving shaft and said driven shaft for aligning said driving shaft and said driven shaft with respect to each other.

6. An optical apparatus employing an automatic focusing system as claimed in claim in claim 5, wherein at least one of said driving shaft and said driven shaft is supported loosely so as to be capable of inclining with respect to the direction of said optical axis.

7. An optical apparatus employing an automatic focusing system as claimed in claim 3, wherein said driving shaft is coaxially and movably provided in said projecting member.

8. An optical apparatus employing an automatic focusing system as claimed in claim 1, wherein said driving means includes an electric motor, an electrical circuit therefor, and switching means for opening and closing said electrical circuit, said switching means being associated with the axial movement of said driving shaft so as to close said electrical circuit upon the connection of said clutch means.

9. An optical apparatus employing an automatic focusing system as claimed in claim 8, further comprising a distance measuring or focus detecting circuit arranged to be closed by said switching means upon the connection of said clutch means.

10. An optical apparatus employing an automatic focusing system as claimed in claim 8, wherein said driving shaft is urged to fully projecting position through an intermediate projecting position and said switching means is arranged to cause said electrical circuit to be opened when said driving shaft is in the fully projecting position, the connection of said clutch means being achieved with said driving shaft being at the intermediate projecting position.

11. An optical apparatus employing an automatic focusing system as claimed in claim 8, further comprising a warning circuit for making a warning when said optical instrument is incompletely mounted on said main body.

12. An interchangeable optical instrument for use with an optical instrument main body, comprising:
an optical system defining an optical axis;
optical system moving means for moving said optical system;
a mounting member releasably coupled with a mating mounting member of said optical instrument main body for attaching said interchangeable optical instrument to said optical instrument main body and having a mounting surface brought into close contact with a mating mounting surface of said mating mounting member with said mounting member coupled with said mating mounting member;
position restricting means for restricting the position of said mounting member in relation to said mating mounting member of said optical instrument main body;
a rotatable driven shaft extending in parallel with said optical axis of said optical system and connected to said optical system moving means; and
a clutch portion provided at one end of said driven shaft to be engaged with a driving shaft of said optical instrument main body, said driven shaft being disposed in the vicinity of said position restricting means so that the deviation of rotational axes between said driven shaft and said driving shaft is reduced when said mounting member is coupled with said mating mounting member of said optical instrument main body.

13. An interchangeable optical instrument as claimed in claim 12, wherein said position restricting means includes a recess formed on said mounting member to open at said mounting surface and said driven shaft is disposed concentrically with said recess to have said clutch portion project into said recess.

14. An interchangeable optical instrument as claimed in claim 12, wherein said driven shaft is disposed in a throughhole formed in the mounting member to penetrate said mounting surface and said position restricting means includes a recess formed on said mounting member in the vicinity of said throughhole to open at said mounting surface.

15. An optical apparatus employing an automatic focusing system comprising:
an interchangeable optical instrument having an optical system defining an optical axis and moving means for moving the optical system;
an optical instrument main body including driving means having an electric motor and an electrical circuit for driving said electric motor for automatic focusing operation, said interchangeable optical instrument being releasably mounted on said main body;
position restricting means for restricting mutual positions of said interchangeable optical instrument and said main body when said interchangeable optical instrument is mounted on said main body;
a rotatable driving shaft provided in said main body so as to extend in parallel with said optical axis of said optical system and connected to said driving means and supported so as to be movable between a connecting position and a disconnecting position in the direction of the optical axis of said optical system;
a rotatable driven shaft extending in parallel with said optical axis of said optical system and connected to said driven means and disposed in said interchangeable optical instrument so that said driven shaft is aligned with said driving shaft with said interchangeable optical instrument mounted on said main body;
clutch portions provided on respective end faces of said driving shaft and said driven shaft confronting each other for engaging with each other in association with the movement of said driving shaft to said connecting position and disengaging from each other in association with the movement of said driving shaft to said disconnecting position; and
switching means for closing said electrical circuit in association with the axial movement of said driving shaft to said connecting position.

16. An optical apparatus employing an automatic focussing system as claimed in claim 15, wherein said driving shaft is movable to a fully projecting position beyond the connecting position and is urged to the fully projecting position and said switching means is arranged to open said electrical circuit when said driving shaft is in the fully projecting position.

17. An optical apparatus employing an automatic focusing system as claimed in claim 16, further comprising a warning circuit for making a warning when said interchangeable optical instrument is incompletely mounted on said main body.

18. An optical apparatus employing an automatic focusing system comprising:
an interchangeable optical instrument including an optical system defining an optical axis, driven means for moving said optical system and a first mounting member having a first mounting surface;
a driven shaft connected with said driven means and including a first clutch portion formed at an end face of said driven shaft;
a position restricting recess formed on said first mounting member to open at said first mounting surface;
a main body including an electric motor, an electrical circuit for driving said electric motor for automatic focusing and a second mounting member removably connected to said first mounting member for mounting said optical instrument on said main body and having a second mounting surface brought into close contact with said first mounting surface with said second mounting member connected to said first mounting member;
a driving shaft connected with said electric motor and including a second clutch portion engageable with said first clutch portion formed at an end face of said driving shaft, said driving shaft being supported for movement in the direction of said optical axis of said optical system between an engaging position where said second clutch portion engages with said first clutch portion and a disengaging position where said second clutch portion disengages from said first clutch portion;
a position restricting member penetrating said second mounting member and supported for movement between an advancing position where the restricting member fits into said restricting recess and a retreating position where the restricting member retreats from said restricting recess;
a manually operable member;
restriction releasing means for moving said restricting member from the advancing position to the retreating position in response to the operation of said manually operable member; and
switching means for opening said electrical circuit in response to the retreat of said restricting member from said advancing position.

19. An optical apparatus employing an automatic focusing system as claimed in claim 18, wherein said driven shaft is disposed in a through-hole formed on said first mounting member in the vicinity of said position restricing recess and said driving shaft is disposed in a through-hole formed on said second mounting member in the vicinity of said position restricting member, so that the deviation of axes between said driving shaft and said driven shaft is reduced so as to ensure the engagement of said second clutch portion with said first clutch portion.

20. An optical apparatus employing an automatic focusing system as claimed in claim 18, further comprising first urging means for urging said position restricting member to the advancing position.

21. An optical apparatus employing an automatic focusing system as claimed in claim 20, further comprising second urging means for urging said driving shaft to the engaging position.

22. An optical apparatus employing an automatic focusing system comprising:
an optical instrument main body having driving means for automatic focusing operation;
an interchangeable optical instrument releasably mounted on said main body and having an optical system defining an optical axis and driven means driven by said driving means for moving the optical system;
position restricting means for restricting mutual positions of said interchangeable optical instrument and said main body when said interchangeable optical instrument is mounted on said main body;
a rotatable driving shaft provided in said optical instrument main body so as to extend in parallel with the optical axis of said optical system and connected to said driving means;
a rotatable driven shaft extending parallelly to said optical axis of said optical system and connected to said driven means and disposed to align with said driving shaft when said interchangeable optical instrument is mounted on said main body, said driving shaft and said driven shaft being supported for allowing the relative movement of said driving shaft and said driven shaft in the direction of the optical axis of said optical system;
clutch portions engageable with each other provided on respective end faces of said driving shaft and said driven shaft confronting each other;
urging means for causing the relative movement of said driving shaft and said driven shaft to effect resilient engagement of clutch portion of the two shafts with said interchangeable optical instrument mounted on said optical instrument main body;
manual operable means for causing the relative movement of said driving shaft and said driven shaft to disengage said clutch portions from each other against the action of said urging means.

* * * * *